March 9, 1965
G. H. HURST, JR., ETAL
3,172,301
GEAR SHIFT
Filed Oct. 15, 1962
3 Sheets-Sheet 1
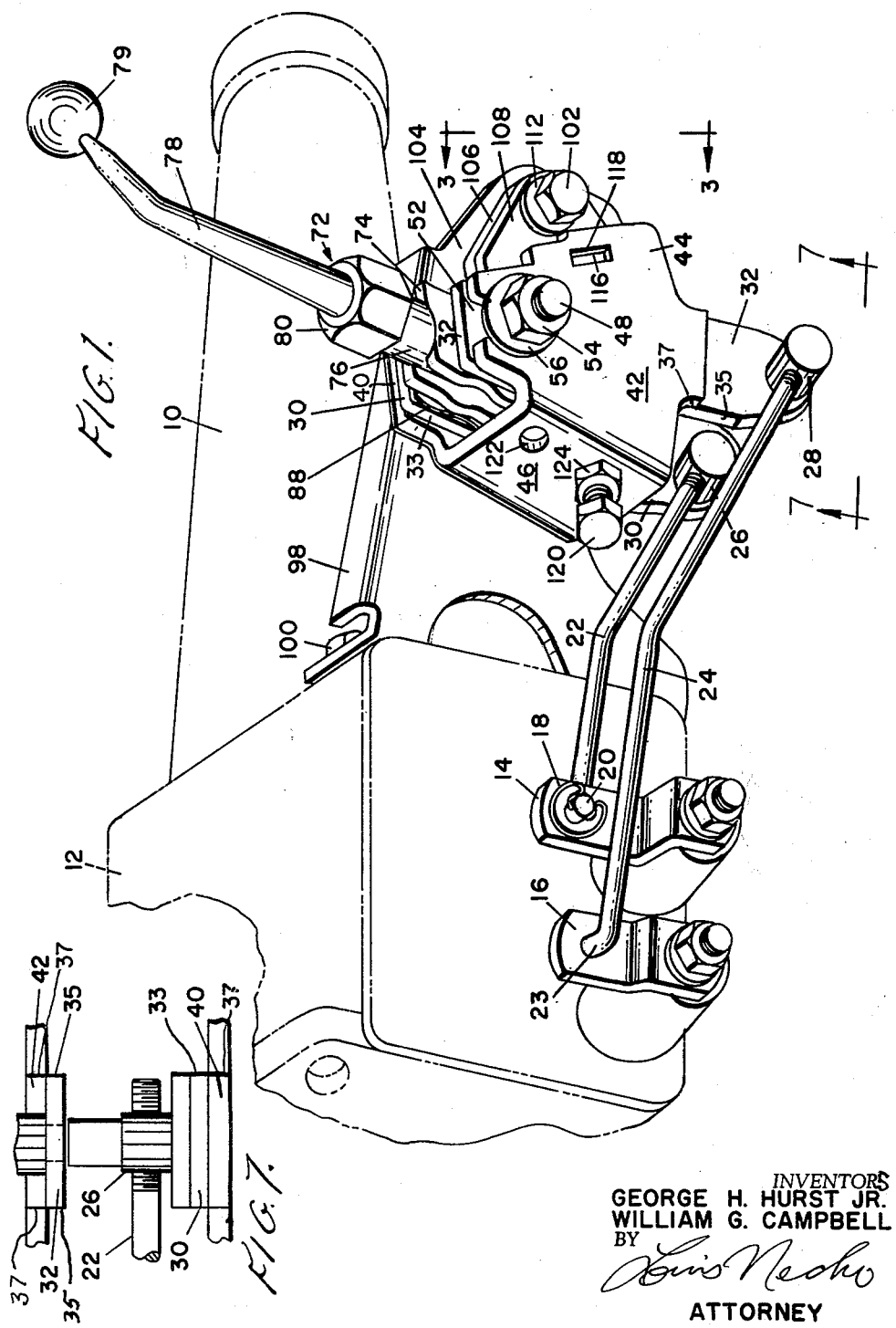
INVENTORS
GEORGE H. HURST JR.
WILLIAM G. CAMPBELL
BY
ATTORNEY

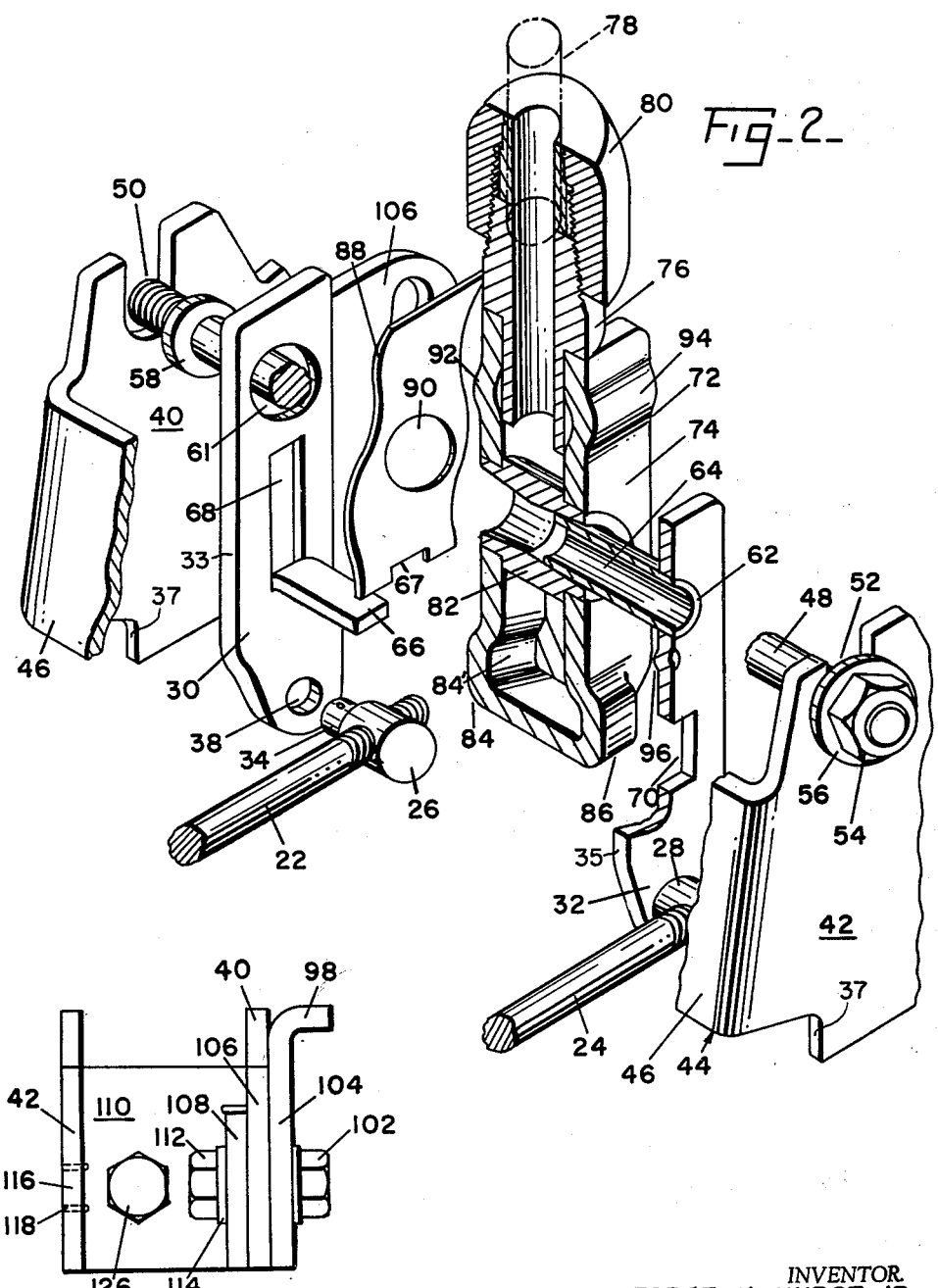

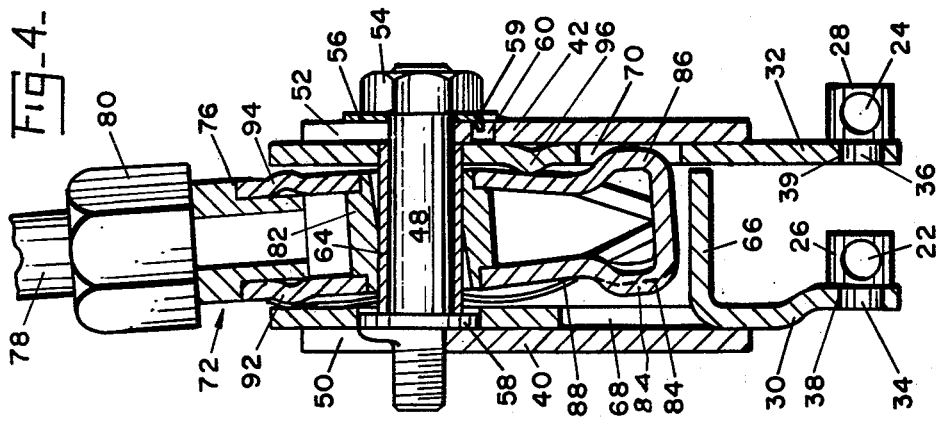
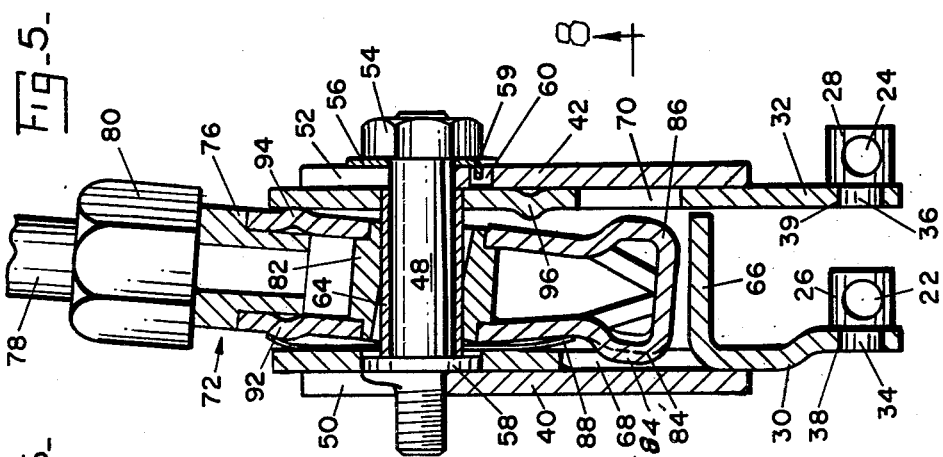
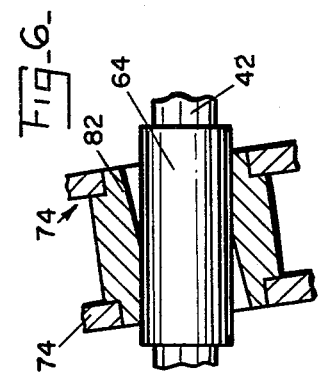
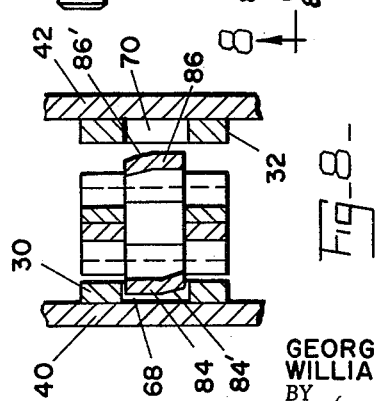

3,172,301
GEAR SHIFT
George H. Hurst, Jr., Abington, and William G. Campbell, Chalfont, Pa. (both of 341 W. Glenside Ave., Glenside, Pa.)
Filed Oct. 15, 1962, Ser. No. 230,330
7 Claims. (Cl. 74—473)

This invention relates to a gear shifting mechanism of the type disclosed in Patent No. 3,052,135, of September 4, 1962.

As set forth in said patent, in operating a standard H-pattern gear shifting mechanism, it is necessary to pause momentarily at "neutral" while shifting from "low" to "second" or from "second" to "low" because it is necessary to move the gear shift handle laterally to disengage it from one actuating lever and to engage it with the other.

One object of the present invention is to provide an improved H-pattern gear shifting mechanism wherein the pause at "neutral" position is substantially decreased and the movement of the gear shift handle from "low" to "second" gear position is substantially continuous.

Another object of the present invention is to provide an improved H-pattern gear shifting mechanism which possesses the aforementioned advantage but which is much less expensive to produce, install and maintain.

A further object of the present invention is to provide stop means for limiting the fore and aft movement of the gear shift handle to prevent damage which may result if the handle is slammed into position with excessive force.

The full nature of this invention will be understood from the following specification and the accompanying drawings wherein:

FIG. 1 is a perspective view showing a gear shift mechanism embodying the present invention, the mechanism being illustrated as mounted on the gear box of an automotive vehicle.

FIG. 2 is an exploded perspective view showing the various parts of the mechanism of FIG. 1 in greater detail.

FIG. 3 is an end view of the gear shift mechanism taken on line 3—3 of FIG. 1.

FIG. 4 is a somewhat fragmentary view, partly in section and partly in elevation, showing the mechanism of the present invention in position for shifting into either the "second" or "high" gear position.

FIG. 5 is a view similar to FIG. 4, but showing the mechanism in position for shifting into either "low" or "reverse" gear.

FIG. 6 is a fragmentary sectional view showing the internal construction of the central sleeve bearing of the gear shift handle assembly.

FIG. 7 is a bottom view taken on line 7—7 of FIG. 1.

FIG. 8 is a sectional view looking in the direction of line 8—8 on FIG. 5.

Referring now in greater detail to the various figures of the drawings wherein similar reference characters refer to similar parts, there is shown a transmission extension housing 10 connected to a gear box 12 having a standard gear system (not shown). The gear trains of this gear system are shifted into "low," "second," "high" and "reverse" by appropriate movement of the gear actuating levers 14 and 16 in the conventional manner. Conventionally, the lower end of lever 14 is connected to the gear train to which shifts the transmission to either "low" or "reverse" while the lower end of the lever 16 is connected to the gear train which shifts the transmission to either "second" or "high." The upper end of lever 14 is releasably attached by a spring connector 18 to the offset end 20 of a connecting rod 22, this offset end 20 being inserted through a corresponding aperture in the lever 14. The upper end of lever 16 is similarly attached to the offset end 23 of a connecting rod 24 by means of a similar spring connector on the invisible side of lever 16. The opposite ends of rods 22 and 24 are screw-threaded and adjustably engaged with corresponding internally screw-threaded apertures in corresponding trunnions 26 and 28 extending laterally from the lower ends of respective gear selector levers 30 and 32.

Trunnions 26 and 28 are separable from the corresponding gear selector levers 30 or 32 (note FIG. 2) and are provided with a reduced portion at 34 and 36, respectively (note FIGS. 2, 4 and 5). Reduced portion 34 is lockingly engageable within an aperture 38 in the bottom portion of the corresponding actuating lever 30 and reduced portion 36 is similarly engageable with a similar aperture 39 in the bottom portion of lever 32. See FIG. 2. Levers 30 and 32 are assembled in laterally spaced relationship between the limbs 40 and 42 of a generally U-shaped housing 44 which includes intermediate wall 46 which is preferably integral with said side walls. Levers 30 and 32 are held between the side walls 40 and 42 by a shaft 48 having screw threads at each end. The ends of shaft 48 are adapted to engage U-shaped bearing slots 50 and 52 in the upper edges of housing side walls 40 and 42. The threaded end of the shaft extending through slot 52 is clamped against wall 42 by a nut 54 bearing against a washer 56, while the opposite end of the shaft is held in the slot 50 by a collar 58 bearing against the inner surface of wall 40. The washer 56 is held in place by a struck-out finger 59 releasably positioned in a hole 60 in side wall 42 (note FIGS. 4 and 5).

Gear selector levers 30 and 32 are provided with central apertures 61 and 62, respectively, and extending between these central apertures in a cylindrical bushing 64. It should be noted that collar 58 fits within aperture 61 when the parts are in assembled condition. Shaft 48 extends through bushing 64 while the levers 30 and 32 are in assembled condition wherein the levers are spaced from each other by a finger 66 struck out from the lever 30 to leave a rectangular aperture 68 in the central portion of lever 30. Finger 66 acts to prevent jamming of the parts when they are assembled. Rectangular aperture 68 is laterally aligned with a rectangular aperture 70 in lever 32 for a purpose to be hereafter explained.

Bushing 64 supports a handle assembly 72 which includes a lower, gear selector lever engaging member 74, an intermediate connecting portion 76 and an upper operating handle 78. Connecting portion 76 has a lower portion fitted within the upper portion of the engaging member 74 and the lower end of handle 78 is held in central bore formed in the connecting portion 76 by a squeeze coupling 80. Coupling 80 is provided with an upwardly tapered vertical bore which is threadedly engaged with a complementary surface on the outer periphery of connecting portion 76. By means of this construction, as the coupling 80 is rotated to move it downwardly, it tightly grips handle 78, and, conversely, by backing off coupling nut 80 the handle assembly is loosened to permit orientation of handle 78. In this manner, handle 78 can be adjusted vertically and can be rotated to orient knob 79 of the handle to suit the driver.

Bushing 64 is positioned within a bearing sleeve 82 provided in the central portion of engaging member 74 of the handle assembly. This bearing sleeve 82 is generally cylindrical, but has an inner bore tapered from each end toward the middle. This permits the handle assembly to rock in the direction of the axis of shaft 48 while permitting rotation of the handle transversely of the axis of said shaft. FIG. 6.

At its lower end, section 74 is enlarged to provide a pair of oppositely extending lateral shoes 84 and 86.

Shoe 84 is adapted to enter aperture 68 in gear selector lever 30 when the handle assembly is rocked in one direction (as in FIG. 5) and shoe 86 is adapted to enter aperture 70 in gear selector lever 32 when the handle assembly is rocked in the opposite direction (as in FIG. 4).

A leaf spring or wave plate 88 is provided with a central aperture 90 through which bushing 64 and shaft 48 pass. Spring 88 biases the handle assembly to the right (as viewed in FIG. 4) or in a direction to engage shoe 86 with aperture 70 in lever 32. This leaf spring also keeps the parts tightly assembled and prevents rattles. Shoes 84 and 86 are provided with inclined or offset surfaces 84' and 86', respectively, which act as ramps and permit a more rapid and easier entrance of the shoes into their respective openings 68 and 70. This is due to the fact that the movement of the shoes into the openings will be at an angle less than the 90 degrees which would be the path of movement of the shoes into the openings in the absence of the ramps. The result is a quicker, smoother and more continuous movement of the shifting handle.

The upper portion of the gear selector lever engaging member 74 is provided with beads 92 and 94 on its opposite side walls, respectively. Bead 92 serves as an abutment means for the upper end of spring 88 and also acts as a fulcrum when the handle assembly is rocked into the position of FIG. 4, while bead 94 acts as a fulcrum when the handle assembly is rocked into the position of FIG. 5. A lug 96 is provided on the inner surface of lever 32 to limit the movement of the shifting handle in the direction illustrated in FIG. 4 and to limit the entry of shoe 86 into opening 70, to prevent abrasive contact between the shoe and the corresponding area of wall 42 and to prevent binding of the shoe in the opening.

The entire gear shifting mechanism is supported by the housing 44 which is carried by a mounting plate 98 which is secured to the gear box by bolts 100 (see FIG. 1), and through which shaft bolt 48 extends. Housing 44 is further secured to the gear box by a bolt 102 which extends through an aperture in a flange 104 of the mounting plate 98, through registering apertures in a flange 106 which is integral with side wall 40 of the housing and in a flange 108 which is integral with a removable back plate 110 of the housing. Bolt 102 is locked in position by a lock nut 112 bearing against a washer 114. Back plate 110 is mounted in correct position by means of a locating and retaining finger 116 on one edge of the back plate, this finger being insertable in a slot 118 on wall 42 of the housing.

In order to prevent excessive travel of the handle assembly when the gears are being shifted, with the consequent excessive wear and possible damage to the parts, a pair of oppositely disposed stop means are provided. One stop means comprises a set screw 120 selectively positioned in one of a pair of vertically spaced openings 122 in front wall 46 (note FIG. 1). Set screw 120 is held in adjusted position by means of a lock nut 124 bearing against the outer surface of wall 46. A similar set screw 126 is provided in back plate 110 (note FIG. 3). By means of these two set screws, when excessive force is used in shifting into "second," section 74 of the handle assembly comes into abutment with the set screw 126 and its continued rearward movement is prevented. In the same manner, when the gears are shifted into "high" with excessive force, set screw 120 limits the forward movement of section 74. Such stop means are not usually required for the shift to "low" or "reverse" since this shifting is generally done slowly.

In the operation of the above-described mechanism, when it is desired to shift from "low" to "second," the handle is moved toward the "neutral" gate. As it approaches this "neutral" position, the handle is biased laterally, or to the position of FIG. 4, by spring 88. The slanted edge 86' of shoe 86 permits shoe 86 to begin approaching opening 70, thereby facilitating the engagement of shoe 86 with opening 70 and permitting a generally continuous motion. When it is desired to shift from "second" back to "low," the handle is moved back to the "neutral" position and is rocked to the position of FIG. 5 against the bias of spring 88. As it approaches the "neutral" gate position, ramp 84' of shoe 84 likewise facilitates engagement of shoe 84 with opening 68.

To insure proper functioning, apertures 68 and 70 must be in exact registration. But, and as can be seen from FIG. 1, once the parts have been assembled, the lower portions of levers 30 and 32 are inaccessible for mechanical measurements and alignments are almost wholly invisible. According to this invention, and as can be seen from FIGS. 1 and 7, this alignment is accomplished by making the lower portions of levers 30 and 32 wholly congruent and we provide levers 30 and 32 with guide surfaces 33 and 35 which, when the mechanism is properly assembled, registers with edges 37 of walls 40 and 42 of the assembly housing 44. To insure that the parts are in proper alignment, the workman cups the lower ends of the levers between his forefinger and thumb and manipulates them until they are in perfect alignment with each other and with the adjacent edges 37 of the lower portions of side walls 40 and 42. In this way, the operator can be sure that the gear selector levers are in alignment. With the parts thus held, the operator tightens nut 54 on shaft, or assembly bolt, 48, to clamp the parts in the correct position.

It will be seen that connecting portion 74, and shoes 84 and 86, do not need accurate, and hence, expensive machining; that ramps 84' and 86', FIG. 8, are produced by upsetting, rather than by expensive machining performed at the approaches to openings 68 and 70; that square openings 68 and 70 are easily punched out and are less expensive than drilled holes; that the upper portion of leaf spring 88 serves to keep the parts tight against rattling and that its lower portion biases the lower selecting end of the shifting handle toward lever 32; that adjustable set screws 120 and 126 make exact manufacture of the shifting handle and associated parts unnecessary, and that the squeeze coupling 80 permits not ony shortening, but also rotation of the handle 78, thereby making it possible to make handles of one length and one configuration which can be readily adjusted, as to length and orientation, at the time that the unit is installed. It will be noted shoes 84 and 86 are formed by bending the metal and are much less expensive to produce than a machined pin passing through a drilled hole in the operating handle. Also, leaf spring or wave plate 88 replaces the upper horizontal spring which in prior structures biased the handle and the lower horizontal spring which biased the pin referred to.

What we claim is:

1. A gear shifting mechanism comprising a housing, a first selector lever, a second selector lever, a shaft carried by said housing, said selector levers being supported by said shaft in generally parallel, spaced relationship, said selector levers being positioned about said shaft for pivotal movement on the axis of said shaft, a gear selector lever engaging member mounted on said shaft between said selector levers for pivotal movement on the axis of said shaft parallel to the plane of movement of said selector levers and for rocking movement in a direction transverse to its pivotal movement, said first selector lever having means for operatively connecting it to a gear system whereby, upon being pivotally moved to a first position, it acts to shift to low gear and upon being pivotally moved to a second position, it acts to shift to reverse gear, and said second actuating lever having means for operatively connecting it to the gear system whereby, upon being pivotally moved to a third position, it acts to shift to second gear and upon being pivotally moved to a fourth position, it acts to shift to high gear, said first selector lever having a first opening and said second selector lever having a second opening in lateral alignment with said first opening, said engaging member having a pair of oppositely-positioned, laterally extending fixed shoes, each shoe being constructed and arranged to enter and engage with a corresponding engagement opening upon rocking movement of said engaging member in the corresponding direction, and a leaf spring mounted on said shaft and bearing on said engaging member to urge the corresponding shoe thereof toward said second selector lever, said engaging member being rockable against the force of the spring toward said first selector lever, said housing including a pair of side walls, a front wall and a rear wall, the front and rear walls being each provided with an adjustable stop means to limit the pivotal movement of the engaging member in opposite directions.

2. The gear shifting mechanism of claim 1 wherein said rear wall is a removable plate.

3. The gear shifting mechanism of claim 1 wherein a spacer is provided to maintain a fixed minimum lateral distance between said selector levers.

4. The gear shifting mechanism of claim 1 wherein guide surfaces are provided on corresponding edges of the side walls of the assembly housing and on the selector levers, the guide surfaces on said selector levers being adapted, when said levers are in alignment, to register with each other and with the surfaces on said side walls to provide a hand feeling means for ascertaining alignment of said selector levers with each other.

5. A gear shift for use in connection with a gear transmission, said mechanism including a housing attachable to said transmission, a shaft carried by said housing, a first gear selector lever rotatable on said shaft to a first position to shift the transmission to low gear and to a second position to shift the transmission to reverse gear, a second gear selector lever rotatable on said shaft to a third position to shift the transmission to second gear and to a fourth position to shift the transmission to third gear, said levers being rotatable in spaced vertical planes, said first lever having a first opening therein, and said second lever having a second opening therein, a gear selector lever engaging member disposed between said levers and rotatable about said shaft in a plane substantially parallel to the planes of movement of said levers, said engaging member being also rockable in the direction of the axis of said shaft, said selector lever engaging member including an upper, operating handle and a lower portion, said lower portion formed of sheet metal deformed to provide a first shoe integral with, and projecting laterally from, one side of the lower portion of said engaging member and engageable with said first opening to integrate said first gear selector lever with said handle, and a second shoe integral with, and projecting laterally from, the opposite side of the lower portion of said engaging member and engageable with said second opening to integrate said second lever with said handle.

6. A gear shift mechanism for shifting the gear trains of a transmission, said mechanism comprising an assembly housing including vertical parallel side walls, a shaft carried by said side walls, a plurality of vertical gear selector levers rotatably mounted on said shaft and selectively engageable with the gear trains of said transmission for shifting to "low," "reverse," "second" and "high"; portions of said levers and of said side walls being manually accessible when the mechanism is assembled and being provided with corresponding guide surfaces on said levers being adapted when said levers are in proper position, to register with each other and with the corresponding surfaces on said side walls to provide hand feel means for aligning said levers on said shaft.

7. A gear shifting mechanism comprising a housing, a first selector lever, a second selector lever, a shaft carried by said housing, said selector levers being supported by said shaft in generally parallel, spaced relationship, said selector levers being positioned about said shaft for pivotal movement on the axis of said shaft, a gear selector lever engaging member mounted on said shaft between said selector levers for pivotal movement on the axis of said shaft parallel to the plane of movement of said selector levers and for rocking movement in a direction transverse to its pivotal movement, said first selector lever having means for operatively connecting it to a gear system whereby, upon being pivotally moved to a first position, it acts to shift to low gear and upon being pivotally moved to a second position, it acts to shift to reverse gear, and said second selector lever having means for operatively connecting it to the gear system whereby, upon being pivotally moved to a third position, it acts to shift to second gear and upon being pivotally moved to a fourth position, it acts to shift to high gear, said first selector lever having a first opening and said second selector lever having a second opening in lateral alignment with said first opening, said engaging member having a pair of oppositely-positioned, laterally extending fixed shoes, each shoe being constructed and arranged to enter and engage with a corresponding engagement opening upon rocking movement of said engaging member in the corresponding direction, a leaf spring mounted on said shaft and bearing on said engaging member to urge the corresponding shoe thereof toward said second selector lever, said engaging member being rockable against the force of the spring toward said first selector lever, and a spacer for maintaining a fixed minimum distance between said selector levers, said spacer being struck out of one of said selector levers with its end abutting the other of said levers.

References Cited by the Examiner

UNITED STATES PATENTS

| | | | |
|---|---|---|---|
| 2,853,895 | 9/58 | Bixby | 74—473 |
| 2,922,315 | 1/60 | Primeau | 74—473 |
| 3,052,135 | 9/62 | Hurst et al. | 74—473 |
| 3,082,639 | 3/63 | Almquist | 74—473 |

DON A. WAITE, *Primary Examiner.*